July 4, 1944.　　　B. W. FREEMAN　　　2,352,831
ORNAMENTING MACHINE
Filed Aug. 7, 1941　　　5 Sheets-Sheet 1

Fig. 1

Inventor
Benjamin W. Freeman,
By Riordan & Riordan
Attorneys

Patented July 4, 1944

2,352,831

UNITED STATES PATENT OFFICE 2,352,831

ORNAMENTING MACHINE

Benjamin W. Freeman, Cincinnati, Ohio

Application August 7, 1941, Serial No. 405,873

6 Claims. (Cl. 101—320)

This invention relates to machines and dies for use in the manufacture of boots and shoes, and more particularly to combined marking and cutting machines, and dies therefor, adapted for operations upon skins, flat upper blanks, fitted or closed uppers, and the like, in which the work is marked or printed with ink, pigment, or its equivalent at the same time, or as part of a cycle of operations, during which the work is also ornamented by perforating or cutting out a design therein.

These markings may be permanent in nature, to form in themselves or in conjunction with the cutouts made in the work, an ornamental design or pattern, or they may be of a temporary nature, either removable or self-effacing, to serve as guide lines for subsequent operations on the work. It follows that markings of both permanent and temporary nature may be applied during the same cycle.

It is a feature of the invention that the marking, and perforating or cutting may be performed as a single complete operation, during which the work is not removed from the machine, nor from a gauged position of alignment with the cutting and marking portions of the die.

Specifically, this invention is directed to variations in and improvements upon the ornamenting machine and die disclosed in the co-pending application of Benjamin W. Freeman, et al., Serial No. 198,120, filed March 25, 1938. The main objects and major features of the structures described in said application are incorporated in the present invention.

Among the objects of the invention is the separation of stripping mechanism including plates, springs, etc., from the operating or ornamenting elements (i. e. the cutting and/or marking elements) of the die unit, while at the same time incorporating necessary stripping means as a self-contained feature of the die unit.

Another object is directed to a work positioning or gauging arrangement which combines in a single means, the functions of gauging the work for accurate positioning in the machine, of supporting the work in an operative position, and of stripping the work from the ornamenting elements of the die and at the same time relates the single means to the marking elements in such a manner as to provide space for application of a marking medium to the die between the work gauging and supporting means and the marking elements.

It is also contemplated that the work will be protected by its supporting and gauging means, from accidental application of ink at all times.

Again, it is desirable to prevent accidental application of the ink or other marking medium to cutting elements of the die, or to any part of the die unit except the marking elements themselves and a further object of this invention contemplates a mounting of the marking elements slightly advanced normally with respect to the cutting elements, such that the marking medium can be applied as a normal operation exclusively to the marking elements, while at the same time mounting the marking elements yieldably such that the cutters may function to operate on the work. Thus when the member for applying the marking medium is positioned between the work gauging and supporting plate and the ornamenting elements of the die, both the work itself and the cutters are protected, yet the marker may be inked with ease.

Still another object includes means to strip the work by a stripping mechanism which, in addition to the above functions, will be normally actuated in stripping by pressure developed by pressure means independently of and separate from the operating elements of the die unit. As broadly as stated this particular object is accomplished in the structure of the aforesaid application, but as an improvement thereupon the instant invention provides for positive acting means engageable with the stripping mechanism to assist such mechanism in its functions.

While the means for applying the stripping pressures is independent of the operating elements of the die, it is a feature that the combined stripper and gauge plate which supports the work, together with the springs or equivalent means for developing stripping pressures, will all be built into the same die unit which includes the marking and cutting or perforating elements.

The positive acting mechanism will, in the preferred forms of the invention, be mounted in the machine proper in such a manner as to partake of a movement relative to the die through a plane, normal to the work supporting or stripping portion of the die unit. Thus if this positive acting mechanism is attached to a moving part of the machine, that moving part might well be the operating plunger of the machine, or if the die is arranged for movement toward and from a fixed reactance surface, such means may be mounted adjacent the fixed surface and the relative movement will still take place.

In the embodiments hereinafter illustrated the positive acting mechanism is positioned at the ends of the die, i. e. at the sides of the machine, but this is intended purely as illustrative since it will be obvious, as the description proceeds, to place said means at any convenient point along the edge of the work support as conditions may warrant, and as conventional paper feed mechanisms found in machines of this nature may require.

The machine of this invention will in general have a reciprocating plunger with a paper feed, the paper feeding from back to front, but the invention is also applicable to machines in which the die is mounted to reciprocate toward and from a fixed surface as well as in machines in which the paper may feed from front to back, or from side to side.

While various relative movements may be arranged to bring the work and die into an ornamenting relation to the plunger or power means of the machine, the preferred embodiments illustrated herein show the die unit in its entirety, with the work accurately positioned thereon, mounted for movement from a work gauging position out in front of the machine where the operator positions the work on the work support, to a work presenting position beneath the plunger of the machine. In this form the work support moves with the die to the work presenting position, but as a variation, the work may be moved with its work support independently of the die, and the die may be mounted either in fixed relation to the bed of the machine, or in fixed relation laterally, upon the plunger of the machine.

As illustrated the machine may be made with removable tables such that both flat bed and anvil type dies may be accommodated as well as cutting and ink marking dies. The illustrated form of cutting and ink marking die in accordance with the invention will be made with its stripper or gauge plate upon which the work may be supported, normally positioned in spaced relation to the ornamenting elements of the die a distance providing sufficient clearance for interposition of an ink roll or pad between the under side of the plate and the upper side of the die proper, as the die is moved from work gauging to work ornamenting position. This spacing also permits ready access to the ornamenting elements, to facilitate cleaning out chips, cuttings, etc.

In the illustrated embodiment there is an inking member which is resiliently mounted upon arms extending towards the rear of the machine, such that in the uppermost position of the roll, the lower part thereof will contact the marking elements of the die. The ink applying mechanism is so arranged and mounted that the inking member will move up and down, due to its resilient mounting, with the raising and lowering of the plunger, and the support for the ink roll will extend between the main part of the die and the stripper, with the stripper or work support mounted on the die at the outside of the ink roll support. Obviously, with this arrangement, the work is supported at one side of the work gauging plate, and the ink applying means for the die is on the other side, whereby only the marker elements are inked, and the plate intervening prevents the inking mechanism from touching the work.

An advantage of this type of construction resides in the fact that the gauge plate, which is also a stripper, is mounted on the die, always in predetermined relation to the cutting and marking elements. The plunger of the machine will, of course, have a throw sufficient to depress the stripper during an ornamenting operation, and to provide the necessary clearance between the stripper and the plunger. Naturally, the smaller the ink roll or the thinner the pad, if a pad is used, the smaller the throw.

The controls and mechanism for insuring accurate placement of the die beneath the plunger may be substantially the same as in the aforesaid application. For a more complete description of the invention and to the attainment of the foregoing and other objects which will appear as the description proceeds, reference may be made to the accompanying drawings, in which:

Referring now more particularly to the drawings, wherein like reference numerals designate like parts, there will be found a main frame or housing 10, which may be mounted upon a suitable stand or base 11. A plunger 12 reciprocates in the frame 10, being driven by a toggle mechanism 13 actuated by a suitable crank mechanism 14. The crank 14 in turn is driven by a main shaft 15 through the medium of a fly wheel or drive pulley 16, controlled by a single revolution clutch mechanism 17. Direct control of the clutch is obtained by a clutch wedge or lever 18. The details of the driving mechanism and clutch mechanism thus far described and diagrammatically illustrated herein are conventional and examples thereof will be found in the patents to Benjamin W. Freeman, Reissue 21,321 of Jan. 16, 1940, and Reissue 20,177, Nov. 17, 1936, and in the patent to Benjamin W. Freeman et al. Reissue 20,294, March 16, 1937, which patents also show the broad principles of combined marking and cutting machines, and dies. For purposes of illustration it may be stated that the clutch mechanism is operatively interposed between the constantly rotating fly wheel pulley 16, and the intermittently rotated shaft 15 and is designed to connect the pulley to the shaft 15 under the influence of the clutch wedge or lever 18, which is pivoted at 19 to the frame of the machine. The clutch lever is in the general form of a bell crank having its wedge portion 18 positioned in the path of a slidable clutch key 17ª in the clutch mechanism 17 and having its lower arm 20 connected to a treadle link 21 which extends to any point convenient to an operator for connection to a treadle.

A treadle spring 22 connected at one end to the link 21 and at the other end to the frame of the machine serves to return the parts to normal position and it will be understood that the clutch, being of the single revolution type, will permit but one cycle of operation of the machine even though the operator might keep the treadle depressed.

The operating portion of the plunger 12 is desirably, though not necessarily, made in the form of a tapered plate or slide 23, provided with an operating surface 24 of brass or other material softer than the cutting edges of the die. An adjusting means 25 is provided for the tapered slide 23, and by means of which the slide may be moved laterally relative to the plunger proper. Such adjustment, by virtue of the tapered upper surface of the slide 23, will have the effect of increasing or decreasing the overall length of the plunger 12, thereby varying both effective length of the stroke of the plunger and the clearance between the plunger and the work support, when the latter is in work presenting position. This variation will in turn vary the pressure applied to the work beneath the surface 24.

A suitable backing paper, or equivalent medium (not shown) may be fed between the surface 24 and the work support, the purpose being to insure a good clean cut in the work and the presentation of a fresh cutting surface to the die for each stroke of the plunger. The backing paper feed mechanism may be directly connected to the crank shaft, in a standard manner, or it may be independently driven in another and different known manner, both forms of mechanism and drive being used on cutout machines or machines for performing both combined cutout and marking operations, now in commercial use.

Mounted in the bed of the machine, in an operating position beneath the plunger 12, is a removable table or auxiliary bed 27, this auxiliary bed being secured in place by, and slidably removable from suitable guides 29. When this auxiliary bed is in place, dies of the flat bed type may be used, the auxiliary bed serving to position the die at the proper elevation with respect to the plunger 12. If it is desired to use a die of the anvil or elevated type, which dies in themselves have a greater height than the flat bed style, for purposes of permitting irregular pieces of work to be draped about the sides of the die, then the auxiliary bed may be removed to afford sufficient clearance for the height of the elevated die.

Secured to the auxiliary bed is a bracket 28 from which a pair of guide arms or trackways 30 project, forming a track for slidably supporting the die unit, whereby the die unit may be positioned at the front of the machine for placement of work thereon, that is upon the work support, and thereafter be slid into the machine upon the bed, to a work presenting location beneath the plunger.

It is important in machines of this nature that various precautions be taken to insure not only safety to an operator, by preventing operation of the machine until all parts are in their proper positions, but also to prevent injury to the work by either premature or delayed action of the machine. Illustrations of such safety mechanisms as are normally used will be found in the aforesaid Freeman patents, the usual arrangement being to provide a suitable stop mechanism, of a conventional nature, effective to limit inward movement of the die, and to lock the treadle or control mechanisms for the plunger until the die reaches a proper position.

Mounted within the frame of the machine is a pair of arms 31—31, which support between their outer ends an ink roll 32. The inner ends of these arms are mounted resiliently upon plungers or cylinders 33—33, each of which houses a spring 34. The plungers 33 are each slidable telescopically in a well 35 at the rear of the auxiliary bed, the lower end of each spring abutting an adjusting screw 36 whereby compression of the springs may be regulated. The spring mounting permits depression of the arms 31 and the ink roll 32 with the plunger, the arms 31 being positioned to clear the die unit as the unit is moved in and out of the machine for normal operations.

The die unit consists of a base 40 carrying tubes or cutters 41 arranged in any desired pattern, these tubes usually being carried on a tube plate 42 which is secured to the die base. Mounted above the tubes and overlying same, is a marker plate 43, carrying marking ribs or projections 44, this marker plate 43 being resiliently mounted for relative movement with respect to the tubes, i. e., after engagement between the work and the ribs 44, the marker plate will yield to permit passage therethrough of the the tubes, the plate of course being suitably perforated.

The springs 45 which support the marker plate do not require sufficient strength to strip the work from the tubes after a perforating operation, it being necessary merely to provide sufficient pressure for printing or marking purposes, and for maintaining the projections to the marker plate in a plane slightly advanced with respect to the plane of the cutting edges, this pressure usually being sufficiently light as not to indent the work when the marking ribs 44 engage the work. It is true that whatever pressure the springs may develop will be added to the stripping pressures hereinafter described, and may, in some slight measure, facilitate stripping but, as stated, this is not their primary purpose. By projecting the marking edges 44 beyond the plane of the cutting edges of tubes 41, it is possible to apply ink to the marker plate without, however, getting any ink on the tubes, or upon any parts of the die unit which would tend to produce a smearing of the work.

A combined stripping, work supporting and work gauging plate 48 is resiliently mounted in spaced relation to the marking elements of the die, preferably being spaced a distance slightly greater than the diameter of the ink roll 32.

This plate will be suitably cleared, as indicated at 49 (Fig. 4) to permit passage of the cutting elements or tubes 41 past the plate to the work, and similarly cleared, as at 50, for the marking ribs or projections 44. The plate also carries a gauging means, illustrated herein as an edge gauge 51, by reference to which the work may be accurately positioned and aligned to the die beneath the plate 48. The thickness of this edge gauge need be substantially no greater than the thickness of the work. If desired, spring mounted pins, or any other equivalent gauging medium, may be utilized.

The plate 48 is carried by posts or studs 52 encircled by springs 53, which springs are positioned for compression between the plate 48 and the base 40. The posts 52 are slidable in wells 54, suitably located in the auxiliary bed 27 to mate with corresponding cored openings 55 in the die base. This particular arrangement is but illustrative as obviously any suitable means providing clearance for the posts 52 may be provided.

The springs 53 are, of course, made heavier than the springs 45, since they are used primarily for stripping, whereas the springs 45 are primarily for marking the work.

Figure 1:
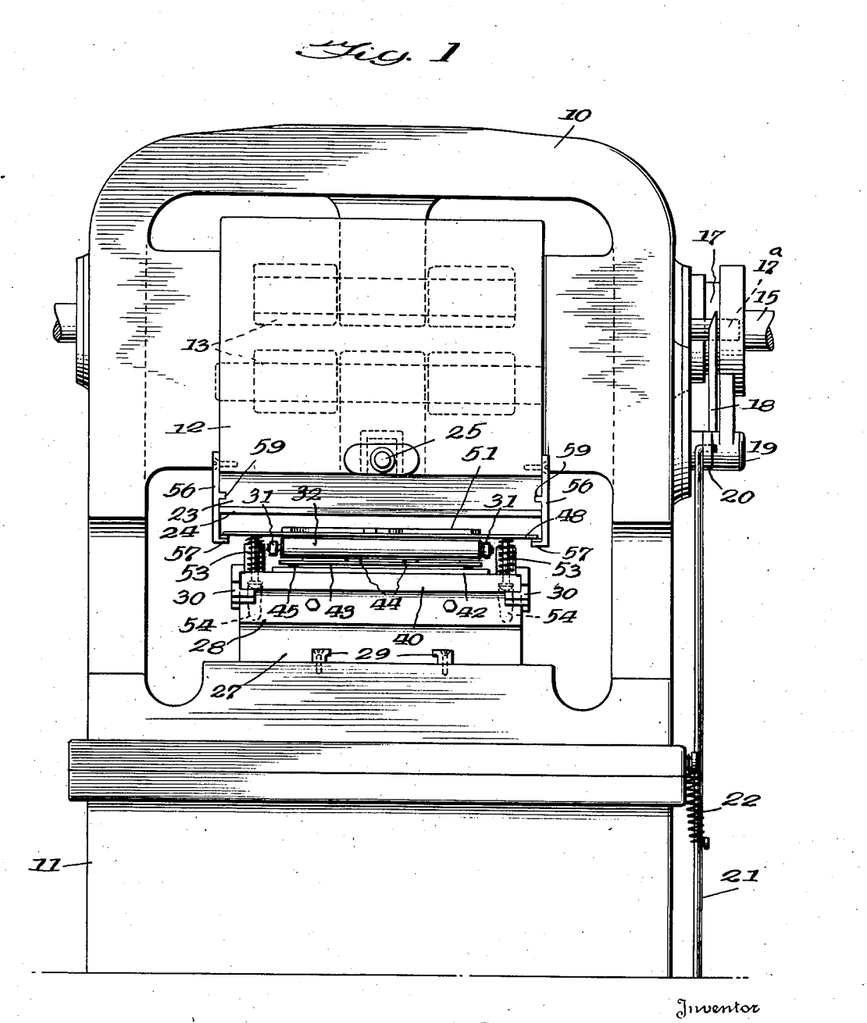
Fig. 1 is a front elevation of the machine, with the die unit mounted therein.
Figure 2:
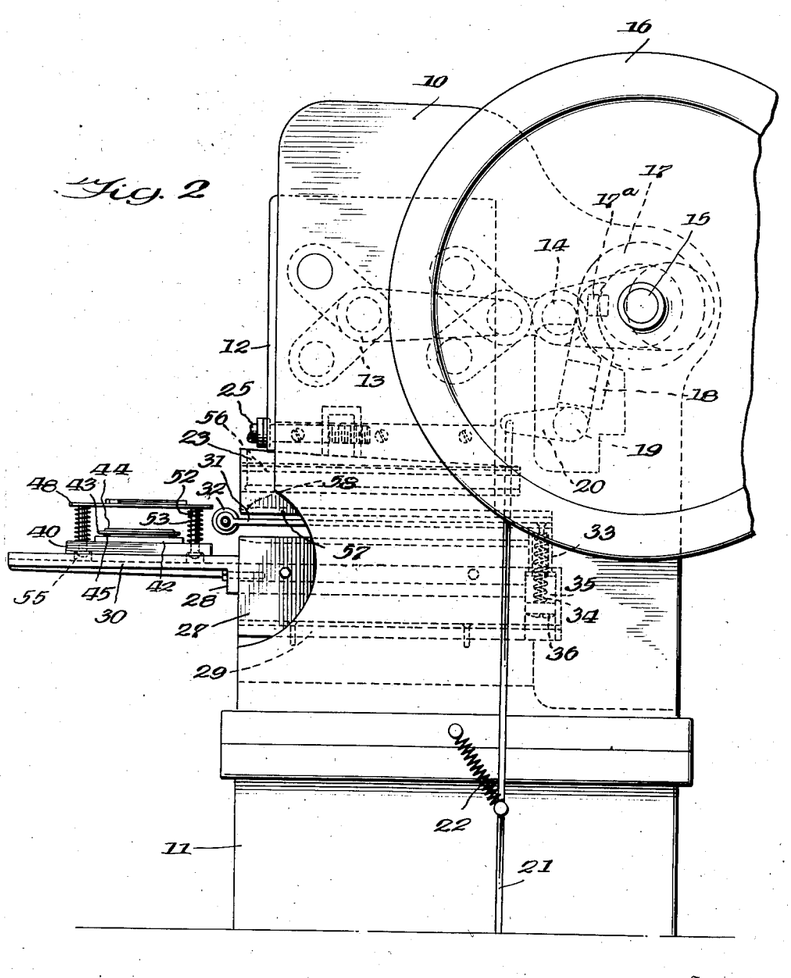
Fig. 2 is a side elevation thereof with the die unit in work placing and gauging position.
Figure 3:
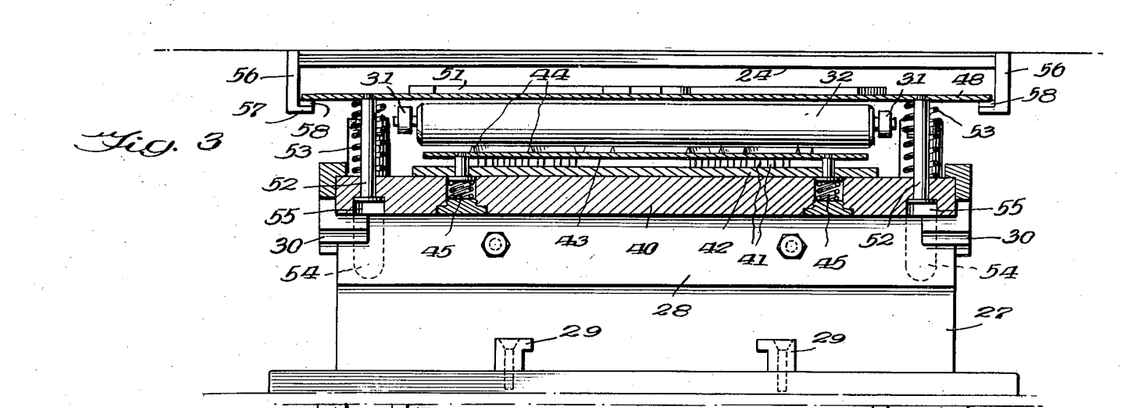
Fig. 3 is an enlarged vertical section through a die unit, with part of the machine shown in elevation.

It will be observed that the work supporting stripper plate 48 is extended at both sides, and is substantially co-extensive with the width of the plunger 12. Referring now particularly to Figs. 1, 2 and 3, the plunger is provided with flanged brackets 56—56, rigidly secured to each side thereof, these brackets extending substantially from front to back along the plunger sides.

The lower portion of each of these brackets 56 is formed with the inturned flanged portion 57, the depending lower portion of the bracket being proportioned to locate the flange 57 just beneath the stripper plate 48, when the plunger and stripper plate are in their normal positions of rest.

It will be observed from Fig. 2 that the flanges 57 are forwardly or outwardly tapered as at 58 to facilitate entry of the plate 48 into the brackets, when the die unit is moved inwardly beneath the plunger. The purpose of the flanges 57 is to exert a direct, positive pull upon the stripper plate when the plunger, after a downward movement, begins to recede from the die, thus assuring stripper operation. In order that this pull may be taken by the brackets 56 and the plunger, rather than merely by retaining screws, the brackets are preferably provided with longitudinally extending ribs 59 which engage channels provided in the sides of the plunger face for the purpose, as shown in Fig. 1.

Figure 4:
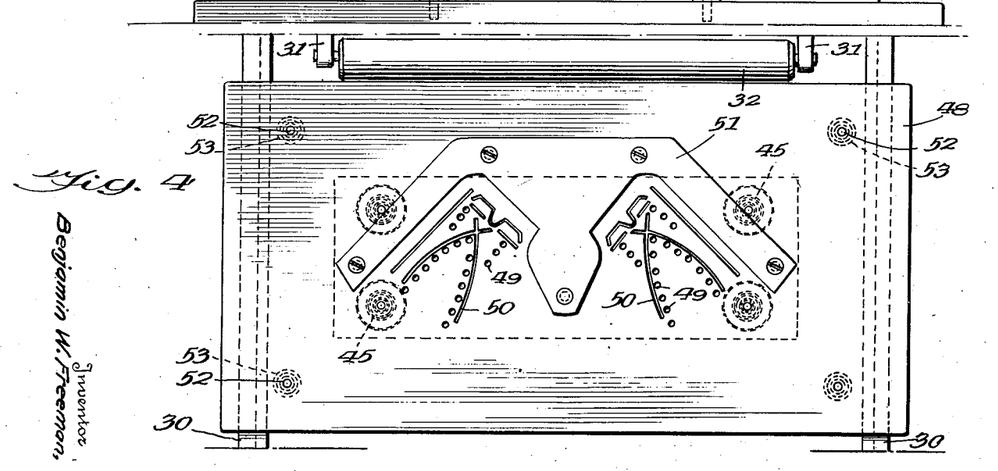
Fig. 4 is an enlarged plan view thereof.
Figure 5:
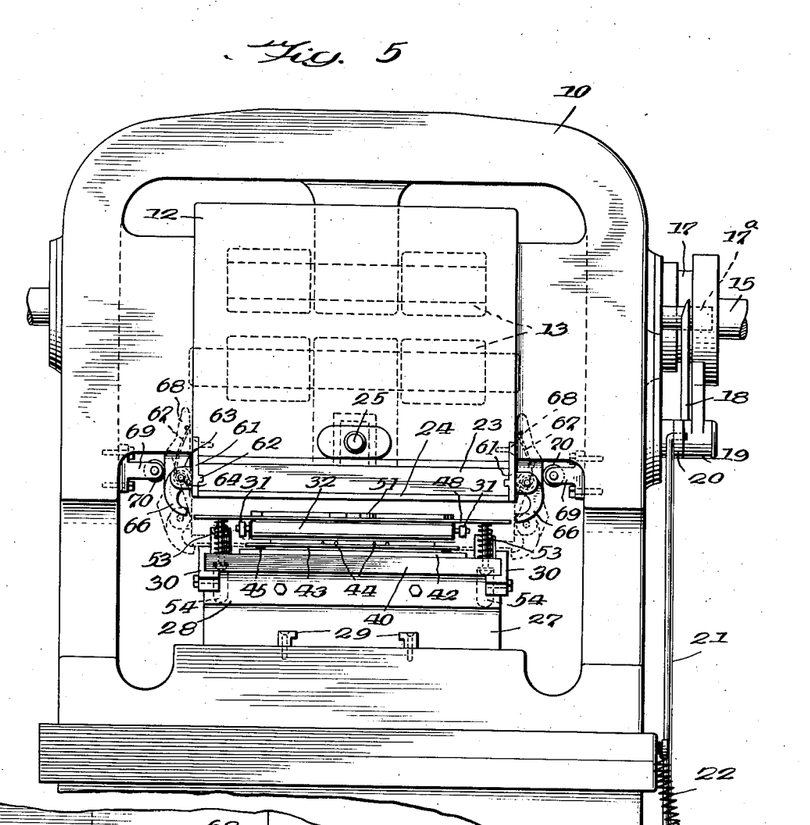
Fig. 5 is a front elevation of a machine with a die unit mounted therein, but illustrating a modification.
Figure 6:
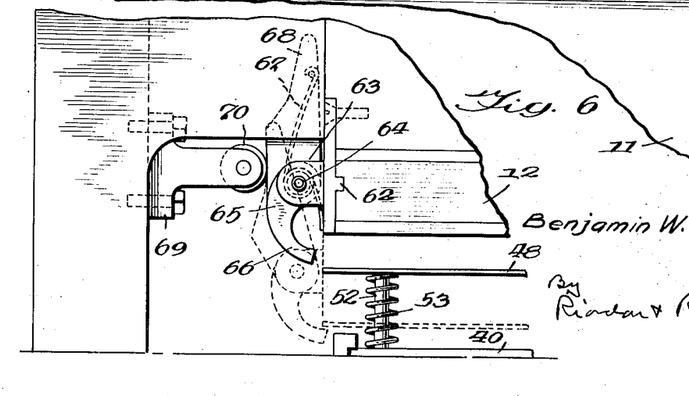
Fig. 6 is an enlarged fragmentary elevation of a detail thereof.
Figures 7, 8:
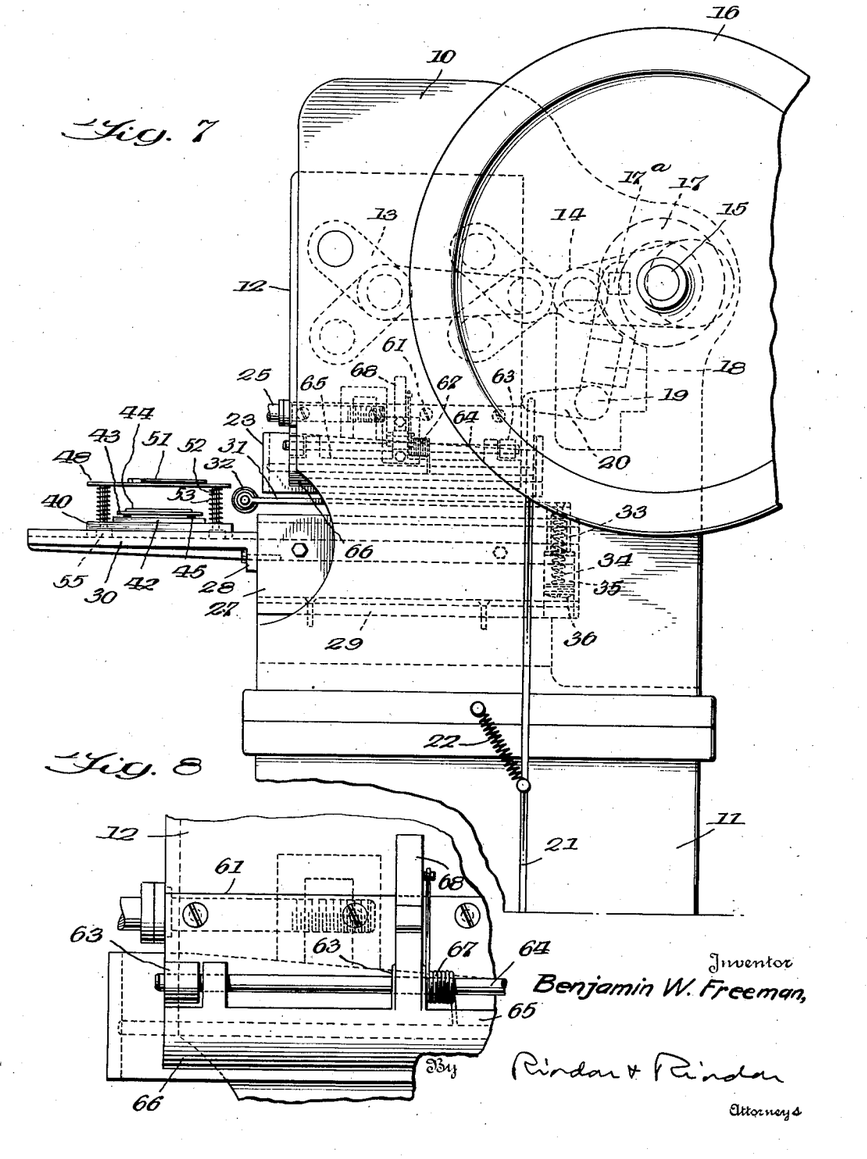
Fig. 7 is a side elevation thereof, with the die unit in work placing and gauging position.
Fig. 8 is an enlarged fragmentary elevation of a detail thereof.

From the foregoing the operation of the machine may be readily ascertained. With the die in its outermost position as illustrated in Fig. 2, work will be placed upon the plate 48 and accurately aligned with the cutting and marking portions of the die, by reference to the edge gauge 51. Fig. 4 illustrates a gauge for accommodating two quarters, but it will be perfectly evident that any suitable gauge to accommodate other patterns, shapes and styles of work may be used.

The die unit is then moved inwardly beneath the plunger, and during its inward movement the ink roll 32 will be interposed beneath the plate 48, i. e., at the opposite side thereof from the work, and will contact the marking ribs 44. Since the work is separated or spaced from the ink roll by the plate 48, and the marking ribs are projected above the cutting edges of the die, it will be obvious that no ink will contact either the work or the tubes. Further, it is preferable that the spacing of the plate 48 above marking ribs will be such as to clear the ink roll, in order that no ink or other marking medium may get on the underside of the plate 48.

As the die is being moved inwardly the flanges 57 will ride beneath the edges of the plate 48. Continued inward movement of the die will clear the ink roll, and the machine may then be treadled. With the provision of safety mechanism as mentioned heretofore, the machine, of course, can not be treadled until the die reaches its innermost position, and is in a location where the openings 55 of the die block coincide with the wells 54 in the auxiliary base 28.

As a further safety item, it will be apparent that before the die unit reaches a position where it releases the controls to permit treadling of the machine, the roll will have passed completely through the die unit, and should the operator's fingers be inadvertently interposed between the underside of the plate 48 of the base 40, the roll will sweep the fingers out of the way; by the same token it follows that regardless of whether or not there is any marking medium on the roll, the passage of the roll across the marking elements will have the effect of sweeping or clearing off any chips or cuttings which might be deposited on the marker as the result of a previous operation.

Upon treadling of the machine the plunger will descend, return and come to rest, through the action of the single revolution clutch 17. With the downward movement of the plunger, the arms 31—31 which support the ink roll will yield, because of their resilient mounting.

The plunger will first engage the work which, in the illustrated embodiment, is on the top side of the plate 48 and then the plate, work and plunger will descend together until the marking ribs engage the work through the openings 50. Continued movement will depress the marker until the tubes 41 engage and perforate the work through the openings 49. Upon recession of the plunger after the cutting and marking operation has been completed, the marker 43 and plate 48 will rise as a unit with the plunger to the limit of movement of the marker, during which time the work is being stripped from the cutting tubes, whereupon the plate 48 will continue to rise with the plunger into a spaced relation to the marker. It will be noted that the stripper springs 53 are larger and more powerful than the marker springs 45, but that the marker renders some slight assistance to the stripping action during its movement with the plate 48.

The springs 53 may be made as heavy as convenient for stripping purposes, without in any manner affecting the ornamenting operations. However, with many kinds of work, wherein there may be a large number of tubes, or other factors which make springs either unsatisfactory or inadequate as a mode of developing stripper plate pressures, it is desirable to provide a positive action for the stripper, and the flanged brackets 56 fulfill this function. Since the brackets are rigidly secured to the plunger, and the flanges 57 extend beneath the stripper 48, when the plunger raises, it raises the stripper plate which, in turn, evenly and positively strips the work from the die. This arrangement also permits use of lighter springs at 53 than would normally be the case.

Obviously, the shape of the stripper, as well as the plunger brackets 56, may be varied in a number of different ways. For example, instead of engaging the stripper at the sides only when the stripping operation takes place, it may be desired to engage at the rear, either with or without side brackets.

In the illustrated embodiment, there is lost motion between the flanges 57 and the under side of the plate 48, the play being equal to the clearance between the plunger face and the top side of the work before downward movement of the plunger face. Because of this lost motion, the form of invention thus far described may not operate satisfactorily at all times with the ordinary type of cutout machine, wherein the paper feed is directly connected to the crank shaft, for the reason that the backing paper cannot be fed until the stripper has actually completed its function, and the stripper brackets 56 in this embodiment will not operate until the lost motion between the bottom of the plunger, or plunger face, and the stripper engaging flanges 57 has been taken up. It will, however, work very nicely with machines equipped with an independent paper feed, wherein the feed is not necessarily controlled by or connected to the crank shaft.

As illustrating a variation in the positive acting stripper, wherein there is no lost motion, i. e., mechanism which will work very nicely with machines having the older conventional type of crank shaft controlled, backing paper feed mechanism, reference is made to Figs. 5, 6, 7 and 8.

It will be apparent, that if the mechanism attached to the plunger is going to raise the stripper immediately upon the up stroke of the plunger, there can be no lost motion between the bracket (or its equivalent) and the stripper. This means that the stripper plate engaging elements or flanges should be extended beyond the plane of the plunger face a distance equivalent only to the normal thickness of work being treated in the machine. But it is not feasible to merely shorten or narrow the extension of brackets 56, since with the minimum clearance permissible to accommodate the length of plunger stroke, stripping functions of the plate 48, and application of ink to the marking ribs as described herein, there would be no way of getting the flanges 57 beneath the edges of the plate 48.

However, the embodiment of Figs. 5 to 8 takes care of the problem.

Firmly secured to the plunger along its lower sides are support strips 61 extending substantially the depth of the plunger, and ribbed as at 62 to insure rigidity and take up loads, as in the case of the ribs 59. Integrally formed lugs or ears 63 are provided at spaced intervals along the strips 61 for the purpose of supporting pintles or pivot shafts 64 which in turn, each pivotally mount an elongated, flanged or curved, stripper plate lifter 65. These members 65 extend substantially the depth of the plunger, and the lower concaved or flanged portions 66 thereof have the same function as the flanges 57 of the previously described form of invention, viz. to engage beneath the plate 48 and positively raise it and the work laid thereon, to strip the latter from the die. But in order that there may be no lost motion, the spacing between the stripper plate engageable surfaces of the portions 66 and the lower face of the plunger 12 is made to approximate the normal thickness of the work and work gauge 51. Obviously, with such a slight clearance, the portion 66 will be above the plate 48 when the machine is at rest, and the plunger in its normal upper position.

Springs 67 are provided for each of the elongated members 65, and are operatively positioned between the pintles 64 and the members 65 such as to normally urge the curved portions 66 inwardly. It will be noted, however, that when the plunger is in its normal upper position with the machine at rest, the portions 66 are held outwardly, beyond the plane of the sides of the plunger by a cam mechanism about to be described, and this allows the portions 66 to pass freely by the edges of the plate as the plunger descends.

The stripper lifters 65 are each provided with an extension forming a cam finger 68, and preferably one end of the spring 67 will be secured to the cam finger, and the other to, or beyond the pintle 64, this being a simple means of positioning the spring. Cam roll brackets 69 are secured to the inner walls of the machine frame 10, and serve to locate cam rolls 70 in the path of travel of the cam fingers 68 on the lifter members 65.

While it is necessary to maintain the curved portions 66 free from interference from the plate 48 until such time as the plunger has descended and these portions have descended below the plane of the plate 48, it is also important that the curved portions 66 move in beneath the plate 48 in time to engage the plate immediately the up stroke of the plunger begins. The proper timing is readily effected by the shape and design of the cam finger, in co-operation with the spring.

The operation is as follows. With the plunger in its normal or upper position of rest, the widest or high part of the cams are directly opposite the rolls 70 and thus the members 65 are held in a substantially vertical position, with the portions 66 out of the way.

As the plunger begins to descend, however, the tapered portions of the cam fingers reach the cam rolls 70 and as they ride past the roll, the springs 67 begin to urge the upper part of the members 65 outwardly, thus pivoting the members about the pintles 64 and bringing the curved lower portions 66 inwardly beneath the plate 48, by the time the low part of the cam is reached.

As the plunger begins its up stroke the plate 48 will, of course, be immediately raised by engagement with the curved portions 66, but by the time the plate 48 reaches its uppermost position the tapered portion of the cam finger 68 will have passed the roll 70 and the curved portion 66 withdrawn from beneath the plate.

This embodiment of the invention, wherein the stripper is raised immediately upon the forward motion of the plunger is particularly well adapted to machines having the older, more conventional type of paper feed mechanisms, connected to the crank shaft of the machine, but it is also readily adaptable to other machines, regardless of the nature of the paper feed mechanism, since the timing of the plate engaging members with respect to the plate 48 is merely a matter of design of the cam finger 68.

It will be observed that in the several embodiments of the invention, the guideways or tracks 30—30 are flanged inwardly over the base of the die, and there will be no tendency for the die to lift off the bed of the machine, due to a positive pull and frictional resistance of the work clinging to the cutters.

Having thus fully described my invention, what I claim as new and desire to secure by Letters Patent of the United States is:

1. In a cut-out and marking machine, a bed and a slide movable thereon, a press plunger located above said bed, the said slide movable to and from position beneath the plunger, said slide comprising a die for cutting and a print marking plate resiliently held in a position in advancement of the cutting die edge, and a resiliently mounted work supporting plate located above the marking plate with means thereon for gauging the position of work on said plate, said work supporting plate having apertures to expose the work to the cutting die and marking plate, inking means for the plate located in the path of the slide so as to pass between the plate and the slide during its movement, and means moving with the plunger engaging the work supporting plate when in position beneath the plunger without impeding the movement of the plate with the slide, for lifting the said plate with the press plunger while maintaining the plate in a plane parallel with the bed thereby applying added stripping pressure in lifting the work away from the die and marking plate, and definitely locating the supporting plate in a plane which will not interfere with the free path of the inking means between the plate and the marking plate.

2. In a cut-out and marking machine, a bed and a slide movable thereon, a press plunger located above said bed, the said slide movable to and from position beneath the plunger, said slide comprising a die for cutting and a print marking plate resiliently held in a position in advancement of the cutting die edge, and a resiliently mounted work supporting plate located above the marking plate with means thereon for gauging the position of work on said plate, said work supporting plate having apertures to expose the work to the cutting die and marking plate, inking means for the plate located in the path of the slide so as to pass between the plate and the slide during its movement, and means moving with the plunger engaging the work supporting plate when in position beneath the plunger without impeding the movement of the plate with the slide, for lifting the said plate with the press plunger while maintaining the plate in a plane parallel with the bed thereby applying added stripping pressure in lifting the work away from the die and marking plate, and definitely locating the supporting plate in a plane which will not interfere with the free path of the inking means between the plate and the marking plate, the said inking means having depressible mounting means extending through the space between the press plunger and the bed, in a plane beneath the work supporting plate when in its resiliently enforced position but with clearance of the die and print marking plate.

3. In a cut-out and marking machine, a bed and a slide movable thereon, a press plunger located above said bed, the said slide movable to and from position beneath the plunger, said slide comprising a print marking plate resiliently held in a position, and a resiliently mounted work supporting plate located above the marking plate with means thereon for gauging the position of work on said plate, said work supporting plate having apertures to expose the work to the marking plate, inking means for the plate located in the path of the slide so as to pass between the plate and the slide during its movement, and means moving with the press plunger engaging the work supporting plate when in position beneath the plunger without impeding the movement of the plate with the slide, for lifting the said plate with the press plunger while maintaining the plate in a plane parallel with the bed thereby definitely locating the supporting plate in a plane which will not interfere with the free path of the inking means between the plate and the marking plate.

4. In a marking machine, a bed and a slide movable thereon, a press plunger located above said bed, the said slide movable to and from position beneath the plunger, said slide comprising a print marking plate resiliently held in a position, and a resiliently mounted work supporting plate located above the marking plate with means thereon for gauging the position of work on said plate, said work supporting plate having apertures to expose the work to the marking plate, inking means for the plate located in the path of the slide so as to pass between the plate and the slide during its movement, and means moving with the press plunger engaging the work supporting plate when in position beneath the plunger without impeding the movement of the plate with the slide, for lifting the said plate with the press plunger while maintaining the plate in a plane parallel with the bed thereby definitely locating the supporting plate in a plane which will not interfere with the free path of the inking means between the plate and the marking plate, the said inking means having depressible mounting means extending through the space between the press plunger and the bed, in a plane beneath the work supporting plate when in its resiliently enforced position but with clearance of the die and print marking plate.

5. In a cut-out and marking machine, a bed and a slide movable thereon, a press plunger located above said bed, the said slide movable to and from position beneath the plunger, said slide comprising a die for cutting and a print marking plate resiliently held in a position in advancement of the cutting die edge, and a resiliently mounted work supporting plate located above the marking plate with means thereon for gauging the position of work on said plate, said work supporting plate having apertures to expose the work to the cutting die and marking plate, inking means for the plate located in the path of the slide so as to pass between the plate and the slide during its movement, and means moving with the plunger engaging the work supporting plate apertures to expose the work to the cutting die and marking plate, inking means for the plate located in the path of the slide so as to pass between the plate and the slide during its movement, and means moving with the plunger engaging the work supporting plate when in position beneath the plunger without impeding the movement of the plate with the slide, for lifting the said plate with the press plunger while maintaining the plate in a plane parallel with the bed thereby applying added stripping pressure in lifting the work away from the die and marking plate, and definitely locating the supporting plate in a plane which will not interfere with the free path of the inking means between the plate and the marking plate, the means moving with the press plunger comprising elements so located with respect to the plunger and the work supporting plate that the latter will pass over them upon movement of the slide to position beneath the plunger when the plunger is in its inactive position.

6. In a marking machine, a bed and a slide movable thereon, a press plunger located above said bed, the said slide movable to and from position beneath the plunger, said slide comprising a print marking plate resiliently held in a position, and a resiliently mounted work supporting plate located above the marking plate with means thereon for gauging the position of work on said plate, said work supporting plate having apertures to expose the work to the marking plate, inking means for the plate located in the path of the slide so as to pass between the plate and the slide during its movement, and means moving with the press plunger engaging the work supporting plate when in position beneath the plunger without impeding the movement of the plate with the slide, for lifting the said plate with the press plunger while maintaining the plate in a plane parallel with the bed thereby definitely locating the supporting plate in a plane which will not interfere with the free path of the inking means between the plate and the marking plate, the means moving with the press plunger comprising elements so located with respect to the plunger and the work supporting plate that the latter will pass over them upon movement of the slide to position beneath the plunger when the plunger is in its inactive position.

BENJAMIN W. FREEMAN.